United States Patent [19]

Kanamaru

[11] Patent Number: 4,782,402
[45] Date of Patent: Nov. 1, 1988

[54] VIDEO DISK WITH MULTIPLEXED VIDEO AND DIGITAL INFORMATION

[75] Inventor: Hitoshi Kanamaru, Saitama, Japan

[73] Assignee: Pioneer Electronic Corporation, Tokyo, Japan

[21] Appl. No.: 26,329

[22] Filed: Mar. 16, 1987

[30] Foreign Application Priority Data

Mar. 14, 1986 [JP] Japan .................................. 61-56461
Mar. 14, 1986 [JP] Japan .................................. 61-56464
Mar. 14, 1986 [JP] Japan .................................. 61-56465

[51] Int. Cl.$^4$ .......................... G11B 7/00; H04N 5/85
[52] U.S. Cl. ..................................... 358/343; 358/342
[58] Field of Search ............... 358/341, 342, 343, 335; 360/19.1, 35.1, 9.1, 33.1, 36.2, 39

[56] References Cited

U.S. PATENT DOCUMENTS 3,789,137 1/1974 Newell .
4,446,488 5/1984 Suzuki .
4,641,204 2/1987 Sugiyama ............................. 358/341
4,727,433 2/1988 Dakin .................................. 358/343

FOREIGN PATENT DOCUMENTS 0025277 11/1981 European Pat. Off. .
0084777  5/1983 European Pat. Off. .
0093374  9/1983 European Pat. Off. .
0107295  6/1984 European Pat. Off. .
0118936  7/1984 European Pat. Off. .
0127033 11/1984 European Pat. Off. .
0180477  7/1986 European Pat. Off. .
0175308  9/1986 European Pat. Off. .
2921892 11/1980 Fed. Rep. of Germany .
3417788  8/1985 Fed. Rep. of Germany .
3701763  9/1987 Fed. Rep. of Germany .
2106302  4/1983 United Kingdom .
2144942  3/1985 United Kingdom .

Primary Examiner—Robert L. Richardson
Attorney, Agent, or Firm—Sughrue, Mion, Zinn, Macpeak, and Seas

[57] ABSTRACT

A recording and reproducing device for frequency division multiplexing of a television video and a digital data signal. The digital signal is interleaved in blocks so that the length of an interleaved block is longer than a video field but shorter than a video frame. The interleaved digital data is recorded so that an end of a group of blocks corresponds to a vertical synchronizing signal for the video signal.

9 Claims, 8 Drawing Sheets

VIDEO DISK WITH MULTIPLEXED VIDEO AND DIGITAL INFORMATION

BACKGROUND OF THE INVENTION

1. Field of the Invention

The present invention relates to a video disk on which a television video signal is recorded and it also relates to recording and reproduction devices for the video disk.

2. Background of the Invention

Disks, on which information is recorded at a high density, have been recently developed and put on the market. Typical examples of the disks are a video disk and a digital audio disk. There are a number of types of such video disk and digital audio disk.

A spectrum is recorded on an optical video disk as shown in FIG. 1. A television video signal is recorded on the disk by frequency modulating a carrier to set the sync chip level at 7.6 MHz and the white level at 9.3 MHz. Audio signals such as a right and a left stereo signals and bilingual signals are recorded on the disk by frequency modulating a carrier of 2.3 MHz and a carrier of 2.8 MHz.

The spectrum of EFM (eight-to-fourteen-bit modulation) signals for right and left stereo audio PCM (pulse code modulation) signals recorded on an optical digital audio disk occupies a band below about 2 MHz, as shown in FIG. 2.

Since the band below 2 MHz is almost empty on the video disk as described above, an EFM signal can be subjected to frequency division and multiplexing operation so as to be simultaneously recorded on the video disk. FIG. 3 shows a spectrum in such a case. It is understood from FIG. 3 that each signal can well be separated.

FIG. 4 shows a block diagram of a recording device for such a video disk. A television video signal whose high-band component is subjected to pre-emphasis by a preemphasis circuit 1 is frequency modulated by an FM (frequency modulation) modulator 2 and then entered into an adder 3. Two audio signals in a first pair of channels are pre-emphasized by pre-emphasis circuits 4 and 5, are frequency modulated by FM modulators 6 and 7 and then entered into the adder 3. Audio signals in another pair of channels are subjected to digitization (PCM) by a PCM encoder 8 and to EFM by an EFM encoder 9. An unnecessary high-band component is removed by a low-pass filter 10 and then entered into the adder 3 through a pre-emphasis circuit 11. As a result, the frequency-modulated television video signal, the frequency-modulated audio signals in two channels and the eight-to-fourteen-bit-modulated audio signals in two channels are added together by the adder 3. The output of the adder 3 is multiplexed by a limiter 12 and then supplied to a light modulator 13. Consequently, a laser beam emitted from a laser light source 14 is modulated depending on the input signal to the light modulator 13. A recording medium 17 rotated by a motor 16 is irradiated with the modulated laser beam through an objective lens 15 to record the signal on the medium 17. Since the art of manufacturing the video disk on the basis of the recording medium 17 is well known, this art is not described in detail herein.

FIG. 5 shows a block diagram of a reproduction device for the video disk manufactured as described above. A laser beam emitted from a pickup 23 is irradiated through an objective lens 24 upon the video disk 22 rotated by a motor 21. The laser beam reflected by the disk 22 is received by the pickup 23 through the objective lens 24 to output a reproduced signal. A reproduced RF (radio frequency) signal is sent out from an RF amplifier 25. The video signal FM carrier component of the reproduced RF signal is supplied to an FM demodulator 27 through a band-pass filter 26 so that the component is demodulated and then outputted through a de-emphasis circuit 28. The audio signal FM carrier components of the reproduced RF signal for the first pair of channels are supplied to FM demodulators 31 and 32 through band-pass filters 29 and 30 so that the components are subjected to frequency demodulation by the demodulators 31 and 32 and then outputted through de-emphasis circuits 33 and 34. The EFM signal component of the reproduced RF signal is separated by a low-pass filter 35 and then supplied to a PCM decoder 38 through a de-emphasis circuit 36 and an EFM decoder 37. In the PCM decoder 38, the component is subjected to EFM demodulation and PCM demodulation so that an analog signal is outputted. As a result, the user of the video disk can select the audio signals of high fidelity together with the video signal to achieve high-fidelity listening.

It can be conceived that a digital data signal is recorded as the above-mentioned EFM signal instead of an audio signal. The digital data signal is different from the audio signal in that the digital data signal is not necessarily a continuous signal. For that reason, it can be thought to be advantageous that a block structure is provided for the digital data signal. Whether a reproduction device for the disk is simple or complicated depends on how the positional relation between the block structure and the corresponding video signal is set.

SUMMARY OF THE INVENTION

Accordingly, an object of the invention is to provide a recording and reproducing device for both a television video signal and a digital data signal.

In the recording and reproducing device of the invention, the digital data is divided into blocks and is interleaved. Each interleaved block is longer than a video field but shorten than a video frame. A group of interlectured blocks are recorded so that their end corresponds to a video vertical synchronizing signal.

DETAILED DESCRIPTION OF THE PREFERRED EMBODIMENTS

Figure 6:
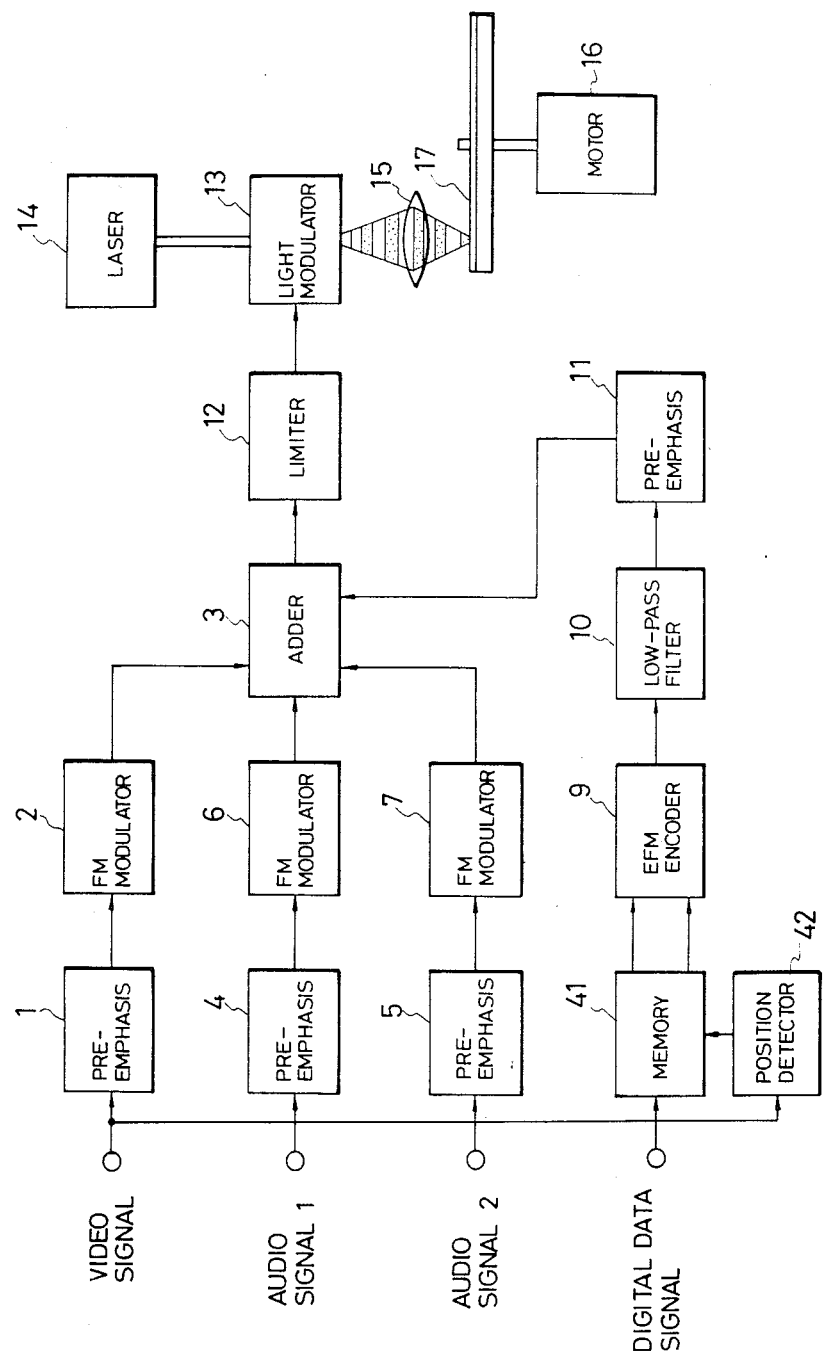
FIG. 6 shows a block diagram of a recording device provided in accordance with the present invention.

FIG. 6 shows a block diagram of a recording device provided in accordance with the present invention. The same symbols in FIGS. 4 and 6 denote mutuallycorresponding portions. The portions shown in FIG. 6 and corresponding to those shown in FIG. 4 are not described in detail hereinafter.

Figure 4:
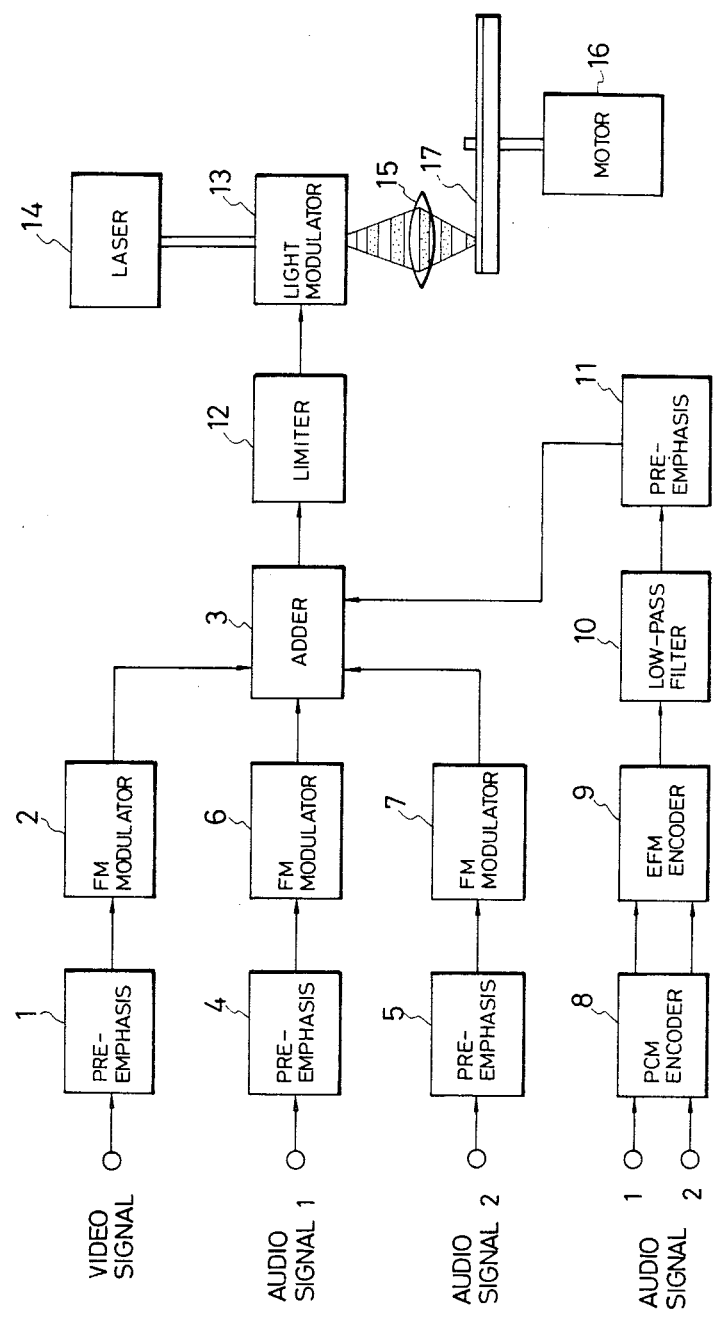
FIG. 4 shows a block diagram of a recording device for a conventional optical digital audio disk.

Although the audio signals in a second pair of channels are entered into the EFM encoder 37 through the PCM encoder 8 in the recording device shown in FIG. 4, in the recording device of FIG. 6 a digital data signal is entered into an EFM encoder 9 through a memory 41. A switch or the like may be provided to selectively enter one of an audio signal and the digital data signal into the EFM encoder 9. A position detecting means 42 detects a prescribed position of a video signal to control the memory 41. A video pre-emphasis circuit 1, an FM modulator 2, an adder 3, pre-emphasis circuits 4 and 5 for audio signals in two channels, FM modulators 6 and 7, a low-pass filter 10 in a signal line from the EFM encoder 9, a pre-emphasis circuit 11, a limiter 12 in a signal line from the adder 3, a light modulator 13, a laser light source 4, an objective lens 15, a motor 16 and a recording matrix 17 shown in FIG. 6 have the same constitution as those shown in FIG. 4.

OPERATION OF DISK AND RECORDING DEVICE

The operation of a disk and the recording device provided in accordance with the present invention is now described. The video signal and the audio signals in two channels are subjected to frequency modulation and addition through the pre-emphasis circuits 1, 4 and 5, the FM modulators 2, 6 and 7 and the adder 3 in the same manner as the recording device shown in FIG. 4. According to the present invention, the prescribed position of the video signal is detected by the position detecting means 42. The detected position may be that of an optional vertical synchronizing signal. For example, the detected position is the position s of a vertical synchronizing signal shown in FIG. 7a. An arrow shown in FIGS. 7a and 7b indicates a position in which a pickup can jump, for the reproduction of a still picture, on a CAV (constant angular velocity) disk on which a video signal for one frame (two fields) per rotation is recorded.

For an ordinary television video signal, one frame is constituted by an odd-numbered field ($A_1$, $B_1$, $C_1$, $D_1$, $E_1$, $F_1$) and an even-numbered field ($A_2$, $B_2$, $C_2$, $D_2$, $E_2$, $F_2$) following the odd-numbered field. For that reason, the pickup can jump as shown by the arrows in FIG. 7a, near the position of a vertical synchronizing signal across which the change from an even numbered field to an odd-numbered field takes place. That is jumping can occur at the positions s.

For a television video signal generated by performing the 3-2 pull-down of a motion-picture film having 24 frames per second, there are a first portion ($a_1$, $a_2$, $c_1$, $c_2$, $e_1$, $e_2$) in which the same frame is recorded in two sequential fields, and another portion ($b_1$, $b_2$, $b_3$, $d_1$, $d_2$, $d_3$, $f_1$, $f_2$, $f_3$) in which the same frame is recorded in three sequential fields.

Figure 7A:
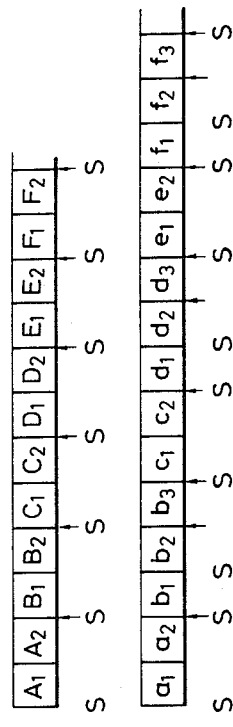
FIG. 7a and 7b show a mimic view of fields of television video signals.
Figure 7B:
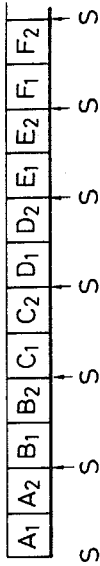

The position in which the pickup can jump for the reproduction of the still picture is such that the same frame occupies both of the two fields before the position, as shown by the arrow in both FIGS. 7a and 7b. For that reason, the position s detected by the position detecting means 42 is the position of an inter-field synchronizing signal located one frame (two fields) before that of another synchronizing signal in which the pickup can jump as shown by an arrow. Two such positions s are present in the portion in which the same frame is recorded in three sequential fields. One of these two positions s is selected for the three-field frame.

Upon the lapse of a prescribed time after the detection of the position s by the position detecting means 42, the digital data signal stored in the memory 41 by the time of the lapse the prescribed time is outputted therefrom to the EFM encoder 9 so that the signal is subjected to processing such as interleaving. The signal is then entered into the adder 3 through the low-pass filer 10 and the pre-emphasis circuit 11 so that the signal is added to the frequency-modulated video signal and audio signals. As a result, the end of the digital data signal is recorded so as to be located before a position corresponding to the position s of the video signal.

The length of one block of the digital data signal can be set at an optional value such as 1 kilobyte or 2 kilobytes. For example, the length is set at 2.35 kilobytes ($=24\times98$) or 18.816 kilobits so as to correspond to the length (98 frames, each corresponding to 24 bytes) of an audio signal not yet subjected to EFM for an optical digital audio disk. The length of one block of the digital data signal not yet subjected to interleaving is set at about 13.3 ms. As a result, the dispersion through the interleaving by the EFM encoder for the optical digital audio disk extends with a length of about 14.7 ms. For that reason, the length of the digital data signal subjected to the interleaving is about 28 ms.

Figure 8:
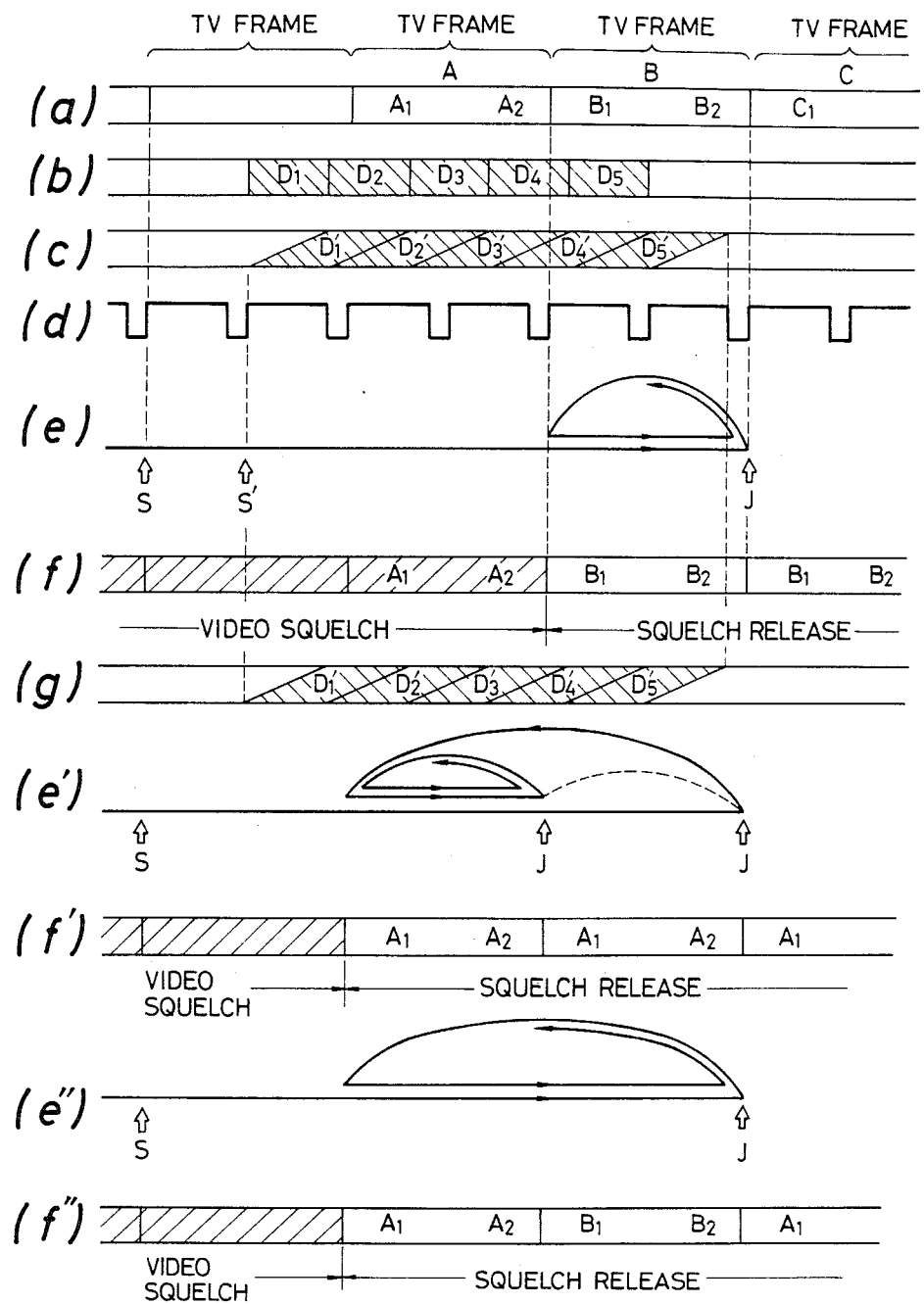
FIG. 8, consisting of (a) (g), (e'), (f') (e'') and (f'') shows a time chart of recording and reproduction by the devices.

Since the interval (equal to the length of one field) between vertical synchronizing signals is about 16.7 ms, the length of one block of the digital data signal not yet subjected to the interleaving is shorter than the one-field interval between the vertical synchronizing signals but the length of one block of the digital data signal subjected to the interleaving is longer than the length of one field and shorter than the length of one frame. For that reason, if digital data signals $D_1$–$D_5$ (as shown in FIG. 8($b$)) for five blocks are interleaved and recorded (as shown in FIG. 8($c$)) starting with a time point s' located a prescribed time after a position s located before a television frame A, in such a manner that the digital data signals correspond to video signals a and B (as shown in FIG. 8($a$)) for two frames, the end of fifth block $D_5'$ of the interleaved digital data signal is recorded before a position corresponding to a vertical synchronizing signal (the synchronizing signal shown in FIG. 4($d$)) located immediately after the second field $B_2$ of the frame B. However since it is preferable that jump-back at the time of reproduction is performed during a vertical fly-back time, no digital data signal should be recorded during the vertical fly-back time in which a vertical synchronizing signal is present. The block signals adjacent to each other are folded together, and the beginning of the first interleaved block $D_1'$ is located within the preceding frame whose contents do not necessarily correspond to the block $D_1'$. This overlap is shown by comparing FIG. 8($c$) to FIG. 8($a$).

If the data of the blocks $D_1$ and $D_2$ are not used or are ineffective data, related data can be prevented from being located in a preceding frame as described above, but the amount of data decreases by the inhibition.

REPRODUCTION DEVICE

Figure 1:
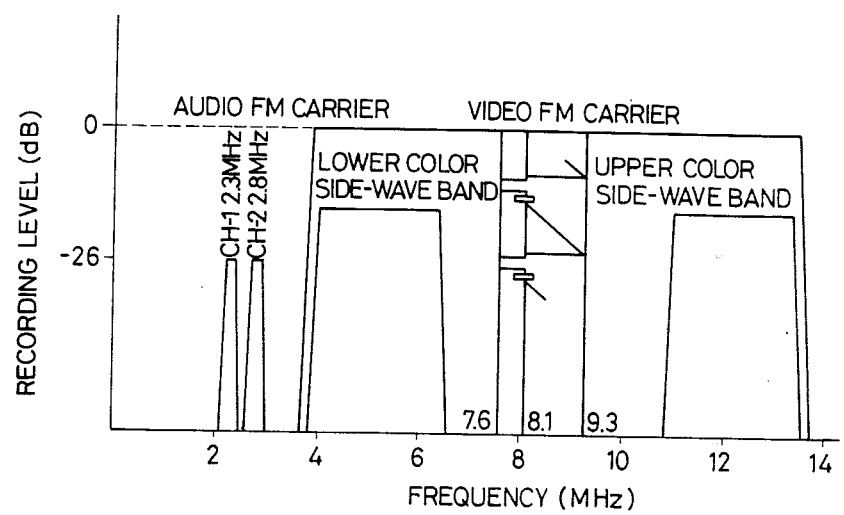
FIG. 1 shows a spectrum of an optical video disk.
Figure 2:
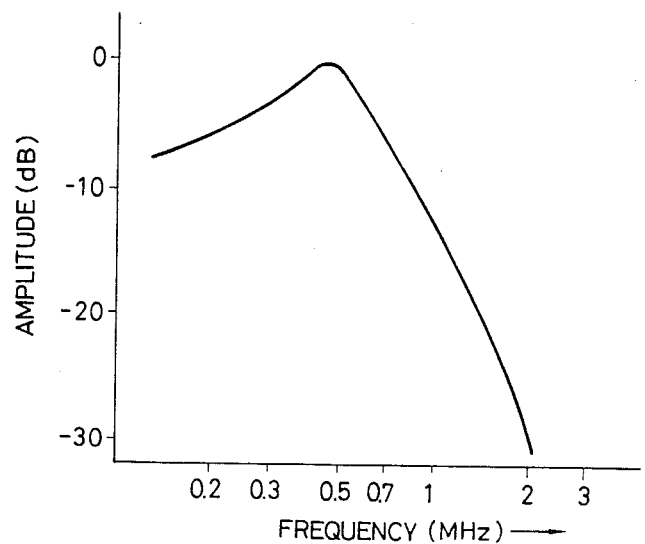
FIG. 2 shows a spectrum of an EFM signal.
Figure 3:
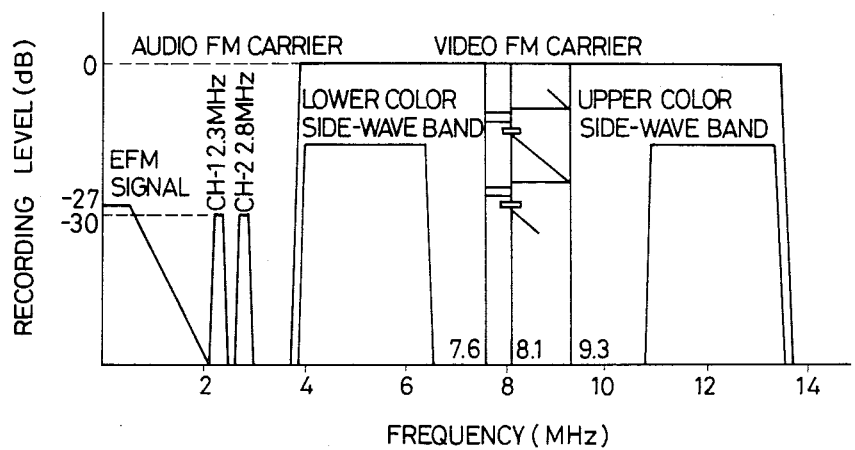
FIG. 3 shows a spectrum of an optical video disk on which an EFM signal is recorded.
Figure 5:
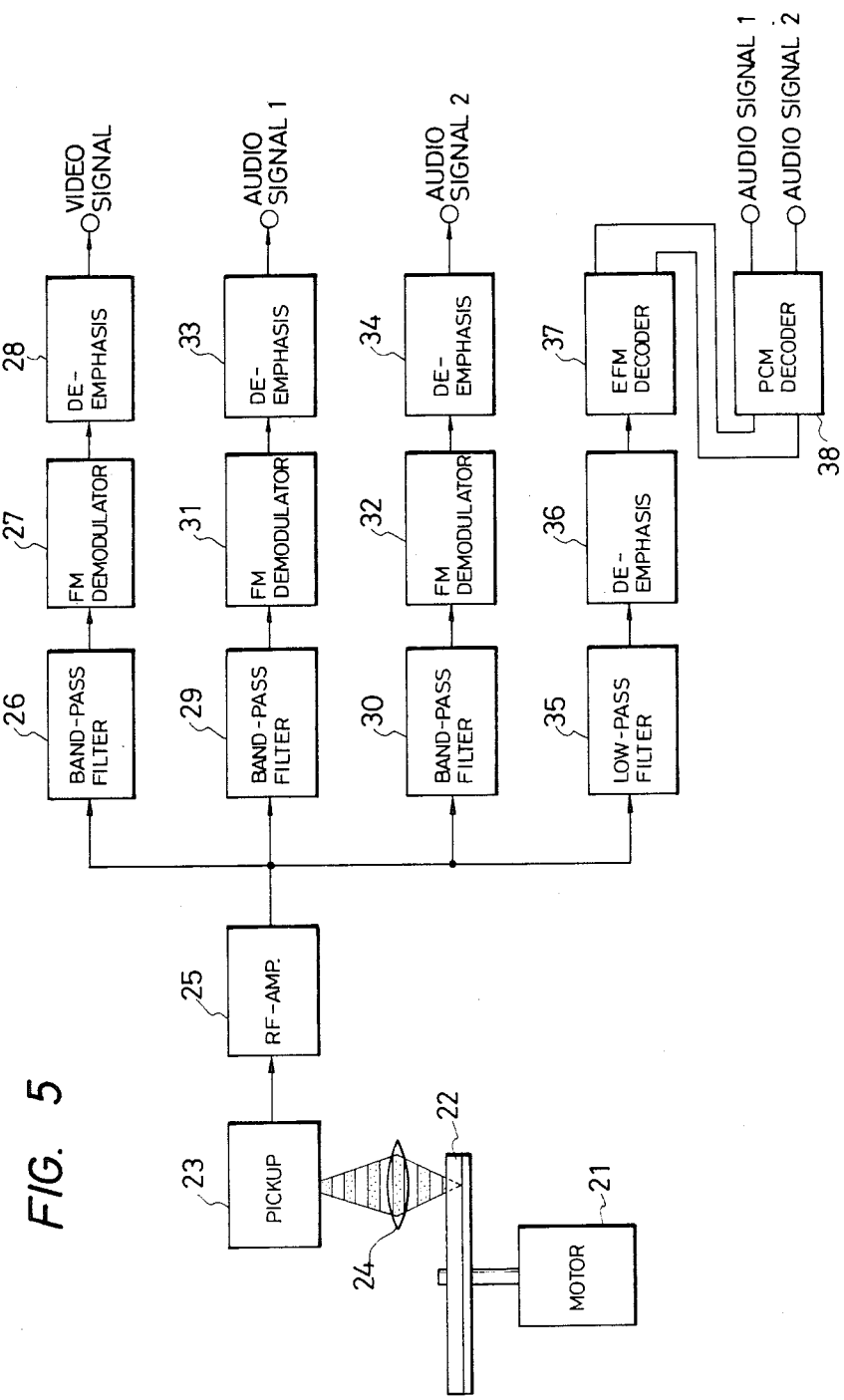
FIG. 5 shows a block diagram of a reproduction device for the conventional optical digital audio disk.
Figure 9:
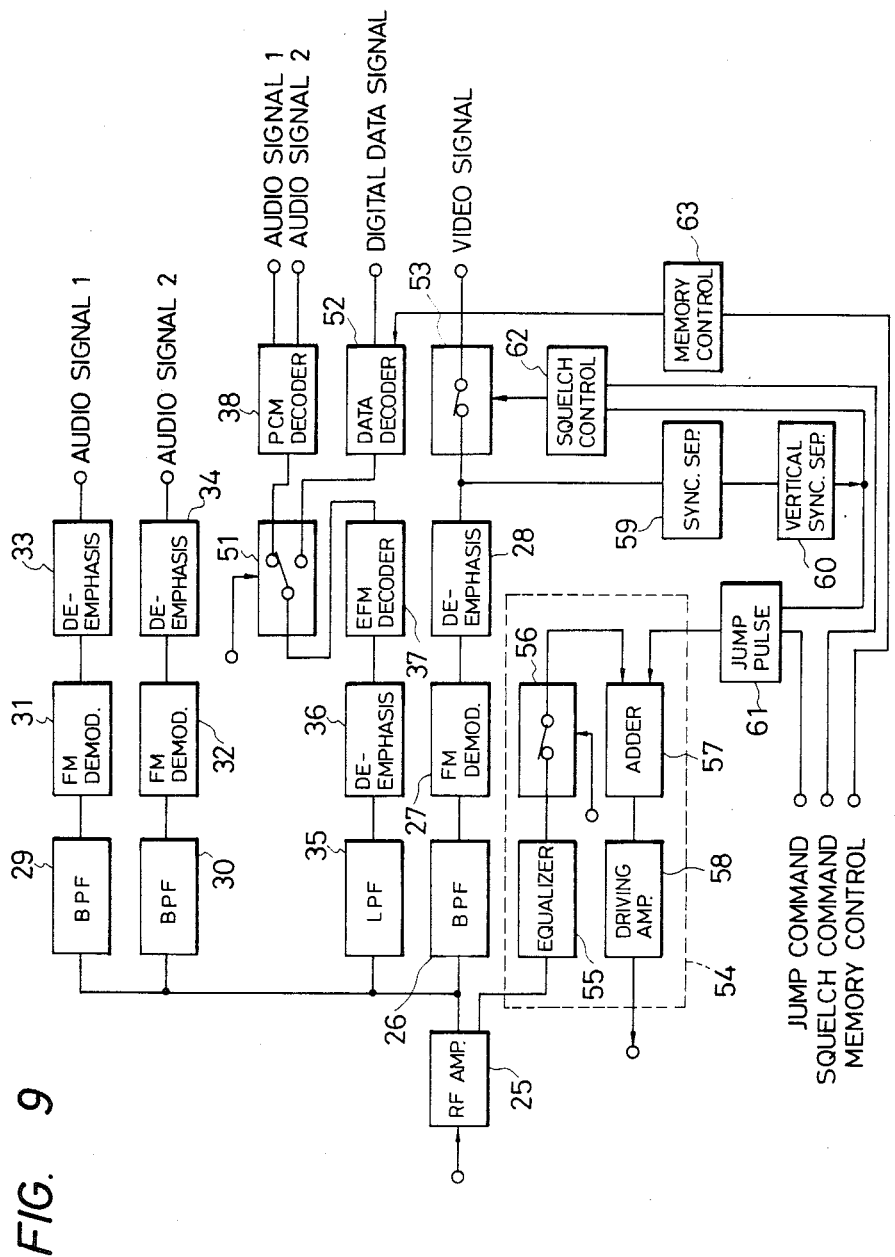
FIG. 9 shows a block diagram of a reproduction device provided in accordance with the present invention.

FIG. 9 shows a block diagram of a reproduction device provided in accordance with the present invention. The same symbols in FIGS. 5 and 9 denote mutuallycorresponding portions. The portions shown in FIG. 9 and corresponding to those shown in FIG. 2 are not described in detail hereinafter.

In the reproduction device, the output of an EFM decoder 37 is supplied alternatively to a data decoder 52 or a PCM decoder 38 through a switch 51. In accordance with a command from a microcomputer or the like not shown in the drawings, the switch 51 is shifted to the PCM decoder 38 when an audio signal is recorded as the EFM signal and to the data decoder 52 when a digital data signal is recorded as the EFM signal. If the PCM decoder 38 can be used for the digital data signal as well, the data decoder 52 may be omitted and the switch 51 may be provided at the output of the PCM decoder 38. A switch 53 squelches a video signal sent from a de-emphasis circuit 28. A tracking control circuit 54 comprises an equalizer 55, into which a tracking error signal sent from an RF amplifier 25 is entered, a loop switch 56 for a tracking servo loop, an adder 57 and a driving amplifier 58 for driving a tracking actuator not shown in the drawings. The video signal sent from the de-emphasis circuit 28 is applied to a synchronizing separation circuit 59 and then to a vertical synchronizing separation circuit 60 so that a vertical synchronizing signal is separated and detected. A signal generated on the basis of the detection of the vertical synchronizing signal is supplied to a jump pulse generation circuit 61 and a squelch control circuit 62. A memory control circuit 63 regulates the memory (RAM 75 shown in FIG. 10) of the data decoder 52. A jump command signal, a squelch command signal and a memory control signal are applied from the microcomputer to the jump pulse generation circuit 61, the squelch control circuit 62 and the memory control circuit 63, respectively.

OPERATION OF THE REPRODUCTION DEVICE

Since the operation of the reproduction device when the EFM signal is not a digital data signal is the same as that described above, that operation is not described hereinafter. Therefore, only the operation of the reproduction device in the case that the EFM signal is a digital data signal is described hereinafter.

When the microcomputer has sent out a command to search for a frame A or digital data $D_1'-D_5'$, the loop switch 56 is opened, the search for the frame A or the digital data $D_1'-D_5'$ is started and the squelch control circuit 62 opens the switch 53 to squelch the video signal. When the frame A or the digital data $D_1'-D_5'$ is detected, the loop switch 56 is closed and the tracking control circuit 54 acts so that normal reproduction is begun. Among other reproduced signals sent out from the amplifier 25, the EFM signal is supplied to the EFM decoder 37 through a low-pass filter 35 and a de-emphasis circuit 36 so that the EFM signal is subjected to EFM demodulation. The EFM demodulated signal is entered into the data decoder 52 through the switch 51 so that the signal is stored in a prescribed memory location in accordance with a signal from the memory control circuit 63 and processed.

When the storage operation on the last block $D_5'$ of the digital data is completed as shown in FIG. 8(g), the jump command signal is applied to the jump pulse generation circuit 61 so that the jump pulse generation circuit 61 sends out a jump pulse to the adder 57 when the next vertical synchronizing signal is detected from the vertical synchronizing separation circuit 60. It is not necessary to wait for the detection of the next vertical synchronizing signal if the jump pulse is sent out immediately after the reading of the last block $D_5'$ is completed. As a result, the tracking actuator is driven by the driving amplifier 58 so that a pickup 23 jumps back by one track (frame) from the vicinity of a vertical synchronizing signal between the second field $B_2$ of a frame B and the first field $C_1$ of a frame C to the vicinity of a vertical synchronizing signal between the second field $A_2$ of the frame A and the first field $B_1$ of the frame B. After that, the frame B is reproduced and one-track jump-back is repeated so that the frame B is reproduced as a still picture. This repetitive jump back is shown in FIG. 8(e).

When the pickup 23 has first reached a position near a vertical synchronizing signal immediately before the frame B, the squelch control circuit 62 acts to close the switch 53 to cease squelching. For that reason, the person using the reproduction device sees only the still picture of the frame B, as shown in FIG. 8(f). When the processing of the digital data signal is completed, the reproduction of the still picture is terminated and the next operation is begun.

Figure 10:
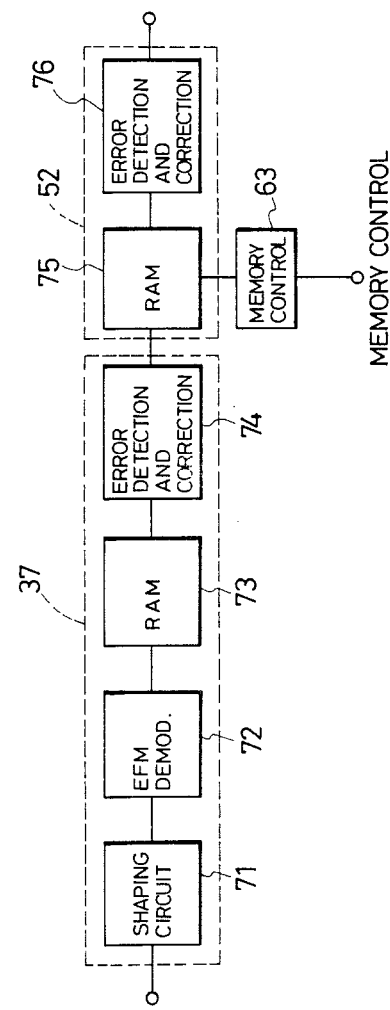
FIG. 10 shows a detailed block diagram of a part of the reproduction device.

FIG. 10 shows a detailed block diagram of the EFM decoder 37 and the data decoder 52. (The switch therebetween is not shown in FIG. 10). In the EFM decoder 37, the inputted EFM signal is shaped by a shaping circuit 71, demodulated by an EFM demodulator 72, once stored in a 16-kilobit (for example) RAM 73, subjected to processing such as de-interleaving, and detected and corrected of an error by an error detection and correction circuit 74. In the data decoder 52, digital data are once stored in the RAM 75, subjected to processing such as reading under a control signal from the memory control circuit 63, detected and corrected of an error by an error detection and correction circuit 76, and outputted. If the capacity of the RAM 75 is set to be not less than the quantity of a series of digital data, the necessary digital data can be stored in the RAM at one time. However, the capacity of the RAM 75 can be also set at about 19 kilobites which correspond to one block. Whether or not the quantity of the series of digital data recorded on the disk is more than the capacity of the RAM 75 for storing at one time, the reproducing operation can be performed from the vicinity of the vertical synchronizing signal immediately before the first block $D_1'$ to that of the vertical synchronizing signal immediately after the last block $D_5'$, and the jump-back operation is repeated from the vicinity of the vertical synchronizing signal immediately after the last block $D_5'$ to that of the vertical synchronizing signal immediately before the first block $D_1'$ (regardless of the route between the two vicinities). Also, the processing of the temporarily stored digital data is completed and the next block can thereafter be sequentially stored and processed in sequential jump backs. During the performance, a field or a frame for which a video output is squelched can be arbitrarily selected. For example, it is possible to previously record an identical picture in the frames A, B and C or in the like and reproduce the picture as an apparently still picture during the jump repetition.

As for the starting and ending points of the repetition of the reproducing operation and the jump-back operation, the jump-back can alternatively be executed over two tracks, then the frame A is reproduced and jump-back is executed over one track (regardless of the route), as shown in FIG. 8(e'). Such a process is repeated to reproduce the frame A as a still picture as shown in FIG. 8(f'). In yet another approach shown in FIG. 8(e''), the jump-back can be executed over two tracks, the frames A and B are reproduced and then jump-back is executed by two tracks again. Such a process is repeated to repetitively reproduce the frames A and B as shown in FIG. 4(f'').

If the length of the digital data is that of one block, the length of the one block as a minimum unit after interleaving can be made shorter than that of one frame in order to place the end of the block before a vertical synchronizing signal in a position in which a related jump can be executed and to cease the squelching of a video signal at the time of the detection of a position s to shorten the time of the squelching.

As for the position to which the jump is executed, the interchangeability with a conventional video disk already put on the market can be provided.

Although the still picture is reproduced by the jump-back of the pickup in the reproduction device described above, the still picture can be also reproduced by using a one-field or one-frame video memory.

According to the present invention, for a video disk in which a television video signal and a digital data signal are subjected to frequency division and then recorded in a multiplex manner on the same track of the video disk, the digital data signal is divided into blocks each consisting of a prescribed number of bits and is interleaved so that the length of the blocks after the interleaving is longer than one field of the television video signal and shorter than one frame thereof. The digital data signal is recorded so that its end is located before a position to which a verticals synchronizing signal corresponds. As a result, a series of pictures and a series of block-structured digital data relating to the pictures can be efficiently read from the video disk.

What is claimed is:

1. A video disk having recorded thereon in frequency division multiplex a television video signal and a digital data signal, wherein said recorded television video signal comprises a series of frames, each frame comprising a plurality of fields having a vertical synchronizing signal at one end thereof:
   wherein said recorded digital data signal is divided into blocks each consisting of a prescribed number of bits and is interleaved, thereby having a recorded length after interleaving longer than one of said fields and shorter than one of said frames; and
   wherein an end of said interleaved digital data signal is recorded at a fixed position before one of said vertical synchronizing signals of said recorded television signal.

2. A recording device for a television video signal and a digital data signal, said television video signal comprising a series of frames, each frame being divided into fields with a vertical synchronizing signal located in each field, said digital data signal being divided into blocks each consisting of a prescribed number of bits, said device comprising:
   means for modulating said television video signal;
   means for interleaving said blocks whereby a length of one of said a interleaved blocks is longer than a length of one of said fields and shorter than a length of one of said frames;
   means for detecting said vertical synchronizing signal;
   means for disposing said interleaved blocks so that an end of one or more interleaved blocks is placed before a vicinity of a position of said detected vertical synchronizing signal;
   means for combining said modulated television video signal and said disposed blocks of said digital data signal; and
   means for recording an output of said combining means on a video disk, whereby said television video signal and said digital data signal are recorded in frequency division multiplexing on a same track of said video disk.

3. A reproduction device for a television video signal and a digital data signal, said television video signal comprising a series of frames, each frame being divided into fields with a vertical synchronizing signal located in each field, said digital data signal being divided into blocks each consisting of a prescribed number of bits and being interleaved, whereby a length of said interleaved block is longer that a length of one of said fields and shorter than a length of one of said frames, said television video signal and said interleaved digital data signal being recorded in time division multiplexing on a same track of a video disk, an end of the recorded digital data signal comprising one or more blocks being recorded before the vicinity of a position of said vertical synchronizing signal, said device comprising:.
   means for producing a reproduction signal from a track of a video disk;
   filter means for separating said television video signal and said digital data signal from said reproduction signal;
   means for reproducing continuously a plurality of said blocks of said digital data signal from their beginning to their end; and
   means for reproducing at least one of said frames of said television video signal recorded after one of said vertical synchronizing signals located a fixed position relative to said beginning of said blocks and recorded before a prescribed position of said video signal located after said end of said blocks.

4. A reproduction device for a television video signal and a digital data signal, said television video signal comprising a series of frames, each frame being divided into fields with a vertical synchronizing signal located in each field, said digital data signal being divided into blocks each consisting of a prescribed number of bits and being interleaved, whereby a length of said an interleaved block is longer that a length of one of said fields and shorter than a length of one of said frames, said television video signal and said interleaved digital data signal being recorded in time division multiplexing on a same track of a video disk, an end of the recorded digital data signal comprising one or more blocks being recorded before the vicinity of a position of said vertical synchronizing signal, said device comprising:
   means for producing a reproduction signal from a track of a video disk;
   filter means for separating said television video signal and said digital data signal from said reproduction signal;
   means for reproducing continuously a plurality of said blocks of said digital data signal from the beginning to the end of said plurality of said blocks;

means for detecting a beginning and an end of a first group consisting of a prescribed number of fields of said television video signal, said first group corresponding to said reproduced plurality of blocks of said digital data signal; and means for squelching said television signal when said reproducing means is reproducing blocks of said digital data signal recorded in a section of said track of said video disk other than a section in which is recorded said first group from its said beginning to its said end.

5. A reproduction device for a television video signal and a digital data signal, said television video signal comprising a series of frames, each frame being divided into fields with a vertical synchronizing signal located in each field, said digital data signal being divided into blocks each consisting of a prescribed number of bits and being interleaved, whereby a length of said an interleaved block is longer that a length of one of said fields and shorter than a length of one of said frames, said television video signal and said interleaved digital data signal being recorded in time division multiplexing on a same track of a video disk, an end of the recorded digital data signal comprising one or more blocks being recorded before the vicinity of a position of said vertical synchronizing signal, a plurality of serially adjacent blocks corresponding to a group of a predetermined number of fields of said television signal, said device comprising:

means for producing a reproduction signal from a track of a video disk;

filter means for separating said television video signal and said digital data signal from said reproduction signal;

means for reproducing continuously a plurality of said blocks of said digital data signal from the beginning to the end of said plurality of said blocks;

means for detecting a beginning and an end of a first one of said groups of said television video signal, said first group corresponding to said reproduced plurality of blocks of said digital data signal;

means for repetitively reproducing at least one frame located between said detected beginning and said detected end of said television video signal;

a memory having a storage capacity not smaller than the contents of at least one block of said digital data signal; and means for storing in said memory on different repetitive operations of said repetitive reproducing means sequential ones of said blocks of said digital data signal.

6. A recording method for a television video signal and a digital data signal, said television video signal comprising a series of frames, each frame being divided into fields with a vertical synchronizing signal located in each field, said digital data signal being divided into blocks each consisting of a prescribed number of bits, said method comprising the steps of:

modulating said television video signal;

interleaving said blocks whereby a length of one of said interleaved blocks is longer than a length of one of said fields and shorter than a length of one of said frames;

detecting said vertical synchronizing signal;

disposing said interleaved blocks so that an end of one or more interleaved blocks is placed before a vicinity of a position of said detected vertical synchronizing signal;

combining said modulated television video signal and said disposed blocks of said digital data signal; and recording an output of said combining step on a video disk, whereby said television video signal and said digital data signal are recorded in frequency division multiplexing on a same track of said video disk.

7. A reproduction method for a television video signal and a digital data signal, said television video signal comprising a series of frames, each frame being divided into fields with a vertical synchronizing signal located in each field, said digital data signal being divided into blocks each consisting of a prescribed number of bits and being interleaved, whereby a length of said interleaved block is longer that a length of one of said fields and shorter than a length of one of said frames, said television video signal and said interleaved digital data signal being recorded in time division multiplexing on a same track of a video disk, an end of the recorded digital data signal comprising one or more blocks being recorded before the vicinity of a position of said vertical synchronizing signal, said device comprising:

producing a reproduction signal from a track of a video disk;

separating said television video signal and said digital data signal from said reproduction signal;

reproducing continuously a plurality of said blocks of said digital data signal from their beginning to their end; and reproducing at least one of said frames of said television video signal recorded after one of said vertical synchronizing signals located a fixed position relative to said beginning of said blocks and recorded before a prescribed position of said video signal located after said end of said blocks.

8. A reproduction method for a television video signal and a digital data signal, said television video signal comprising a series of frames, each frame being divided into fields with a vertical synchronizing signal located in each field, said digital data signal being divided into blocks each consisting of a prescribed number of bits and being interleaved, whereby a length of said an interleaved block is longer that a length of one of said fields and shorter than a length of one of said frames, said television video signal and said interleaved digital data signal being recorded in time division multiplexing on a same track of a video disk, an end of the recorded digital data signal comprising one or more blocks being recorded before the vicinity of a position of said vertical synchronizing signal, said method comprising the steps of:

producing a reproduction signal from a track of a video disk;

separating said television video signal and said digital data signal from said reproduction signal;

reproducing continuously a plurality of said blocks of said digital data signal from their beginning to their end;

detecting a beginning and an end of a first group consisting of a prescribed number of fields of said television video signal, said first group corresponding to said reproduced plurality of blocks of said digital data signal; and squelching said television signal when said reproducing step is reproducing blocks of said digital data signal recorded in a section of said track of said video disk other than a section in which is recorded said first group from its said beginning to its said end.

9. A reproduction method for a television video signal and a digital data signal, said television video signal comprising a series of frames, each frame being divided into fields with a vertical synchronizing signal located in each field, said digital data signal being divided into blocks each consisting of a prescribed number of bits and being interleaved, whereby a length of said an interleaved block is longer that a length of one of said fields and shorter than a length of one of said frames, said television video signal and said interleaved digital data signal being recorded in time division multiplexing on a same track of a video disk, an end of the recorded digital data signal comprising one or more blocks being recorded before the vicinity of a position of said vertical synchronizing signal, a plurality of serially adjacent blocks corresponding to a group of a predetermined number of fields of said television signal, said method comprising the steps of:

producing a reproduction signal from a track of a video disk;

separating said television video signal and said digital data signal from said reproduction signal;

reproducing continuously a plurality of said blocks of said digital data signal from their beginning to their end;

detecting a beginning and an end of a first one of said groups of said television video signal, said first group corresponding to said reproduced plurality of blocks of said digital data signal;

repetitively reproducing at least one frame located between said detected beginning and said detected end of said television video signal; and storing in a memory on different repetitive operations of said repetitive reproducing steps sequential ones of said blocks of said digital data signal, said memory having a storage capacity not smaller than the contents of at least one block of said digital data signal.

* * * * *